July 4, 1939.　　　　H. OWEN　　　　2,164,834
AUXILIARY BRAKING DEVICE FOR VEHICLES
Filed Oct. 4, 1938　　　2 Sheets-Sheet 1
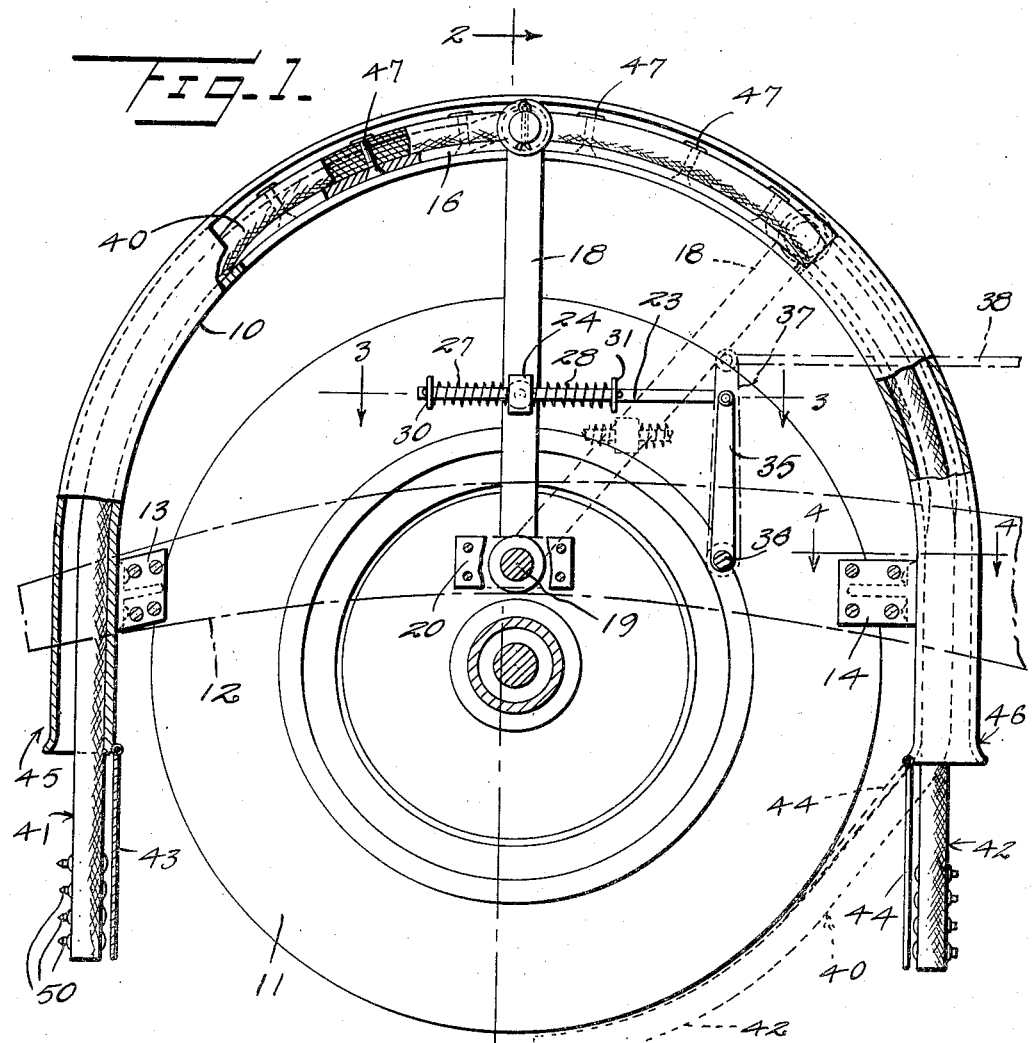
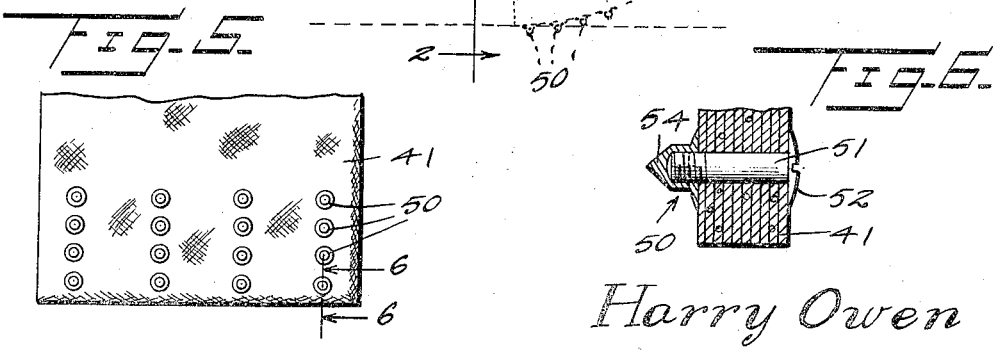
Harry Owen
INVENTOR
BY *Victor J. Evans & Co.*
ATTORNEYS July 4, 1939. H. OWEN 2,164,834
AUXILIARY BRAKING DEVICE FOR VEHICLES
Filed Oct. 4, 1938 2 Sheets-Sheet 2
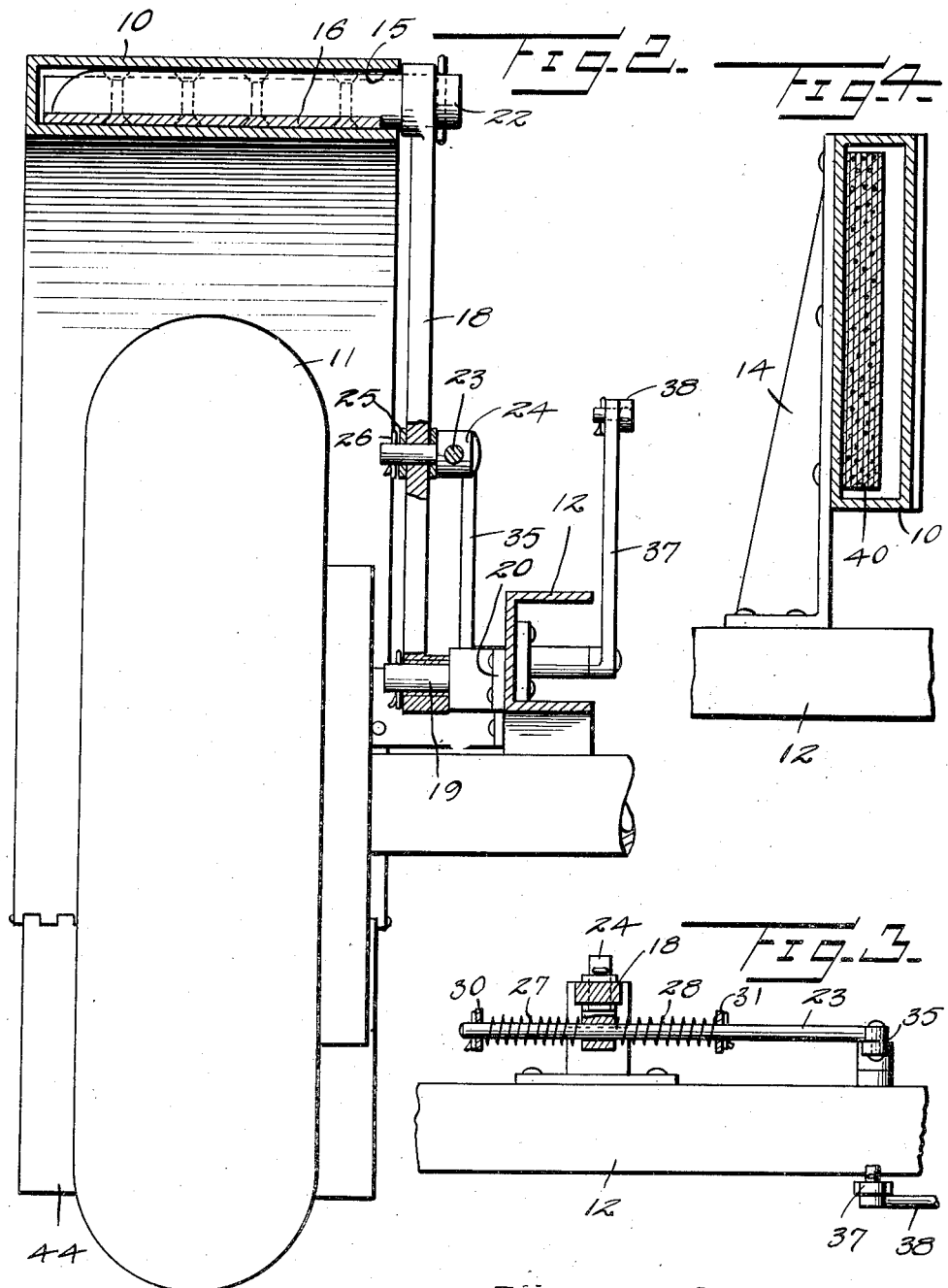
Harry Owen
INVENTOR
BY Victor J. Evans & Co.
ATTORNEYS Patented July 4, 1939

2,164,834

UNITED STATES PATENT OFFICE 2,164,834

AUXILIARY BRAKING DEVICE FOR VEHICLES

Harry Owen, Roosevelt, Utah

Application October 4, 1938, Serial No. 233,311

4 Claims. (Cl. 188—4)

This invention relates to improvements in vehicle braking devices and is particularly concerned with a new and improved auxiliary braking device adapted to use with one or more of the wheels of a vehicle whereby efficient, positive and dependable emergency braking of the vehicle can be effectuated.

It is among the more important objects of the present invention to provide a new and improved emergency or auxiliary braking device for vehicles which is positive in action and which also serves to minimize wear of vehicle wheel tires when the brakes are applied.

Another object of the present invention is to provide a vehicle braking device of the type aforesaid which can upon occasion serve to minimize skidding by facilitating gripping of slippery or smooth pavements by the vehicle.

A noteworthy feature of the novel braking device according to this invention is that the parts thereof are of relatively simple construction and can easily be assembled to form the completed apparatus, thereby well suiting the device to the requirements of mass production with concomitant economy of manufacture.

An advantage of the auxiliary braking device according to the present invention is that the friction or gripping element thereof can be easily and conveniently replaced when worn or when replacement is desirable for other reasons.

Other objects, advantages and features of the new and improved auxiliary braking device according to the present invention will be apparent to those skilled in the art during the course of the following description.

Regarded in certain of its broader aspects the present invention comprises an essentially flexible, retractable, friction element mounted adjacent at least one of the traction wheels of a vehicle and arranged whereby said element can be disposed between the vehicle wheel and the surface upon which the vehicle rests, under such conditions that a tension is placed upon the friction element which in turn is transmitted to and absorbed by relatively stationary supporting members mounted upon the vehicle. It is to be understood, of course, that the friction element is normally in retracted position and is disposed between the vehicle wheel and surface whereon the vehicle rests solely at the operator's option.

In order to facilitate a fuller and more complete understanding of the matter of the present invention, a specific embodiment thereof, herein illustrated, will be hereinafter described, it being clearly understood, however, that the specific embodiment is provided solely by way of example and is non-limitative upon the scope of the present invention except as is expressed in the subjoined claims.

Referring then to the drawings:—

Figure 1 is substantially a front elevational view of the now preferred embodiment of this invention, showing same in position of use as mounted upon part of a vehicle adjacent a vehicle wheel.

Figure 2 is substantially a vertical, sectional view of Figure 1 taken along the line 2—2.

Figures 3, 4, 5 and 6 are essentially fragmentary sectional views of Figure 1 taken along the lines 3—3, 4—4, 5—5, and 6—6, respectively.

Referring now to the drawings and particularly to Figures 1 and 2 thereof, it will be noted that the new and improved auxiliary braking device according to the present invention comprises an essentially U-shaped, inverted, casing member 10 positioned substantially concentrically relative to the axis of rotation of the traction wheel 11 and supported on portion 12 of the vehicle by means including brackets 13 and 14. It is particularly to be noted that the casing is essentially rectangular in cross-sectional outline and is hollow throughout its length. The casing 10 has an opening 15 formed in the inner wall thereof at an intermediate locality substantially equi-distant relative to the ends of the casing for purposes to be hereinafter described. A sliding shoe 16 positioned within the casing 10 adjacent the opening 15 is curved to conform to the interior contour of the casing substantially as shown in Figures 1 and 2.

In the illustrated embodiment of the present invention the means provided for imparting sliding motion to the shoe 16 comprises a lever arm 18 pivotally mounted on the pin 19 attached by means of the fastening member 20 to portion of the vehicle frame. The free end of the lever 18 is connected by means of the pin 22 with the sliding shoe 16 hereinbefore described whereby rotative movement imparted to said lever 18 relative to the pin 19 is reflected in sliding motion of the shoe 16 within the casing 10. Motion is imparted to the lever 18 by means including a shock absorbent sliding connector member 23 received in an opening formed in a pin 24 carried in portion of the lever arm. The pin is essentially freely mounted in the lever arm in a conventional manner, as for example, by means of a washer 25 and cotter pin 26. The sliding connector 23 engages with the pin 24 through means including springs 27 and 28 pressed against the head of the pin 24 and held in position by washers 30 and 31 respectively retained on portion of the connector member 23 by conventional means such as cotter pins or the like. The opposite end of the connector member 23 is pivotally connected to a lever arm 35 carried on a shaft 36 rotatable in conjunction with and by the lever arm 37 which in turn is connected by the bar 38 to suitable operating means. It will be evident that, referring to Figure 1, clockwise rotative motion of the lever arm 37 relative to the axis of rotation of the pin 36 will be translated into clockwise rotative motion of the shoe 16 within the casing 10.

It is to be understood, of course, that the various stationary elements hereinbefore described and the bearings of the moving elements are relatively fixedly mounted on portions of the vehicle frame whereby motions of the elements relative to each other except insofar as is necessary for operation of the device are precluded.

A flexible friction element 40 positioned within the casing 10 and substantially coextensive therewith has projecting end portions 41 and 42 extending from the ends of the casing substantially as shown in Figure 1. End portions 41 and 42 of the friction element are protected from mud thrown from the wheel 11 of the vehicle by means including mud guards 43 and 44 pivotally mounted on end parts generally indicated at 45 and 46 respectively of the casing generally designated by the numeral 10. An intermediate portion of the friction element 40 is attached by fastening means such as for instance rivets 47 to the shoe 16 slidingly positioned within the casing 10 as herein above described, whereby motion can be imparted to the friction element 40 through operation of means connected with the drive rod 38, thereby permitting the operator to increase or diminish the projecting end portions 41 and 42 of the friction element 40. It is particularly to be noted that the projecting end portions 41 and 42 of the frictional element 40 are provided with a plurality of friction augmenting means comprising studs 50 substantially fixedly mounted within said end portions of the friction element essentially as shown in Figure 1. Reference is made now particularly to Figures 5 and 6 wherein details of said studded end portions of the friction element are best displayed. It will be noted that the studs 50 each comprise a screw portion 51 having a head 52 to prevent tearing of the material and also to permit firm holding of the stud within the friction space. The end of the stud 51 distal relative to the head 52 is threaded to receive a pointed cap 54 for engaging with surfaces whereon the vehicle rests during operation of the device.

In use elements of the device are positioned relative to each other substantially as is shown in full lines in Figure 1, that is to say, the projecting end portions 41 and 42 of the friction element 40 are disposed in localities near the front and the rear, on the line of travel of the traction wheel 11. In operating the device tension is applied to the connector member 38, whereby clockwise rotative motion of the lever 37 results with concomitant clockwise rotation of the lever 18. It is to be noted that the springs 27 and 28 absorb shock and result in smooth uniform motion of the several levers comprising the chain of actuating parts. As the shoe 16 is moved in a clockwise direction by clockwise rotation of the lever 18 the friction element 40 is carried therewith whereby the end portion 42 is further extended from the end portion 46 of the casing 10 and the end part generally designated by the numeral 41 of the friction element 40 is retracted within the end portion 45 of the casing 10. When so operated, the surface upon which the vehicle is moving acts against the face of the end portion 42 of the friction element whereby said end portion is disposed between the traction surface of the wheel 11 and the surface whereon the vehicle rests. It is to be noted the pointed heads 54 of the plugs 50 extend upwardly radially relative to the traction surface of the wheel 11 and the flat head portion 52 of the threaded element 51 rests against the tires thereby precluding damage to the traction surface of said tire while permitting gripping action of the pointed heads 54 of the studs hereinbefore described. When so functioning the parts of the device are disposed essentially as is shown in phantom in Figure 1.

It will be evident from the foregoing that the novel device according to this invention provides means for interposing an auxiliary friction element between the traction surface of a vehicle tire and the surface whereon the vehicle rests, thereby precluding wear of the vehicle tire due to use as a friction surface when braking the car.

Having thus described the present invention, what it is desired to procure by Letters Patent is expressed in the following claims.

I claim:

1. In a vehicle having traction wheels, the improvement which comprises auxiliary braking devices, one of said devices being operably associated with at least one of said wheels; each of said devices comprising a casing mounted on parts of the vehicle; a shoe within said casing; means for moving said shoe within said casing; and an essentially flexible, substantially inextensible friction element, essentially fixedly secured to said shoe, extending throughout said casing and projecting from the ends thereof; the projecting end portions of said friction element being freely downwardly dependent in localities near the front and the rear, on the line of travel, of the corresponding traction wheel; the ends of said friction element being provided with friction augmenting means on one face thereof.

2. In a vehicle having traction wheels, the improvement which comprises auxiliary braking devices, one of said devices being operably associated with at least one of said wheels; each of said devices comprising an inverted U-shaped casing, essentially firmly and fixedly mounted on parts of the vehicle, substantially concentrically the axis of rotation of the corresponding wheel; a shoe within said casing; means for moving said shoe within said casing; and an essentially flexible, substantially inextensible, friction element, essentially fixedly secured to said shoe, extending throughout said casing and projecting from the ends thereof; the projecting end portions of said friction element being freely downwardly dependent in localities near the front and the rear, on the line of travel of the corresponding traction wheel; the ends of said friction element being provided with friction augmenting means on one face thereof.

3. In a vehicle having traction wheels, the improvement which comprises auxiliary braking devices, one of said devices being operably associated with at least one of said wheels; each of said devices comprising a casing mounted on parts of the vehicle; said casing being hollow and having an opening formed in a side near an intermediate portion thereof; a sliding curved shoe within said casing near said opening; means for moving said shoe within said casing; and an essentially flexible, substantially inextensible friction element, essentially fixedly secured to said shoe, extending throughout said casing and projecting from the ends thereof; the projecting end portions of said friction element being freely downwardly depedent in localities near the front and the rear, on the line of travel, of the corresponding traction wheel; the ends of said friction element being provided with friction augmenting means on one face thereof, said means comprising studs, having projecting heads, mounted in said material.

4. In a vehicle having traction wheels, the improvement which comprises auxiliary braking devices, one of said devices being operably associated with at least one of said wheels; each of said devices comprising an inverted U-shaped casing, essentially firmly and fixedly mounted on parts of the vehicle, substantially concentrically the axis of rotation of the corresponding wheel; said casing being hollow and having an opening formed in a side near an intermediate portion thereof; a sliding curved shoe within said casing near said opening; means for moving said shoe within said casing comprising a swinging lever arm pivotally mounted on portions of said vehicle and pivoted to said shoe; and an essentially flexible, substantially inextensible friction element, essentially fixedly secured to said shoe, extending throughout said casing and projecting from the ends thereof; the projecting end portions of said friction element being freely downwardly dependent in localities near the front and the rear, on the line of travel, of the corresponding traction wheel, the length of projecting end portions being such that by manipulation of said lever, one end can be extended sufficiently to be disposed between the corresponding traction wheel and the surface whereon the vehicle rests, the opposite end of the friction element being simultaneously retracted; the ends of said friction element being provided with friction augmenting means on one face thereof, said means comprising studs, having projecting heads, mounted in said material.

HARRY OWEN.